United States Patent [19]

Kuwabara et al.

[11] Patent Number: 5,051,930

[45] Date of Patent: Sep. 24, 1991

[54] METHOD AND APPARATUS FOR EDITING DOCUMENTS INCLUDING A PLURALITY OF DATA OF DIFFERENT TYPES

[75] Inventors: Tadashi Kuwabara; Hiroyuki Koreeda; Naomichi Nonaka; Keiichi Nakane, all of Yokohama, Japan

[73] Assignee: Hitachi, Ltd., Tokyo, Japan

[21] Appl. No.: 323,808

[22] Filed: Mar. 15, 1989

[30] Foreign Application Priority Data

Mar. 16, 1988 [JP] Japan .................................. 63-60337

[51] Int. Cl.$^5$ .............................................. G06F 3/14
[52] U.S. Cl. ..................................... 364/523; 364/518
[58] Field of Search ................ 364/518, 521; 340/747, 340/734

[56] References Cited

U.S. PATENT DOCUMENTS

| | | | |
|---|---|---|---|
| 4,503,499 | 3/1985 | Mason et al. | 364/200 |
| 4,703,321 | 10/1987 | Barker et al. | 340/724 |
| 4,815,029 | 3/1989 | Barker et al. | 364/900 |

FOREIGN PATENT DOCUMENTS 0304071 2/1989 European Pat. Off. .

*Primary Examiner*—David L. Clark
*Attorney, Agent, or Firm*—Antonelli, Terry, Stout & Kraus

[57] ABSTRACT

A documentation system for editing a document in which a plurality of document data of different forms coexist in a mixed fashion and which includes one or more pages each partitioned into a plurality of regions in accordance with difference edition processing procedures. The system includes a storage for storing the document data of the above-mentioned document structure, a display for displaying the document data as images, and a program executing unit for executing the programs to process the document data within the region being subjected to the edition. The edition processing programs are provided in correspondence with different edition processing procedures such that a given one of the edition processing programs processes the edition of the document data within one of the regions in the document image being displayed on the display unit. The edition processing program executing currently the edition processing for the document data within a first region responds to a command for the edition processing for a second region other than the first region by issuing an extra-region message. The documentation system further includes a unit for executing programs to make the display unit to display thereon the document data within a region, a unit for executing a manage program for controlling activation of the edition processing program executing unit and activation of the display program executing unit, and a message transfer unit for transferring messages between the edition processing program executing unit and the manage program executing unit. The extra-region indicating message is transferred to the manage program executing unit which responds thereto by activating the edition processing program for the document data in the second region.

13 Claims, 12 Drawing Sheets

FIG.6A
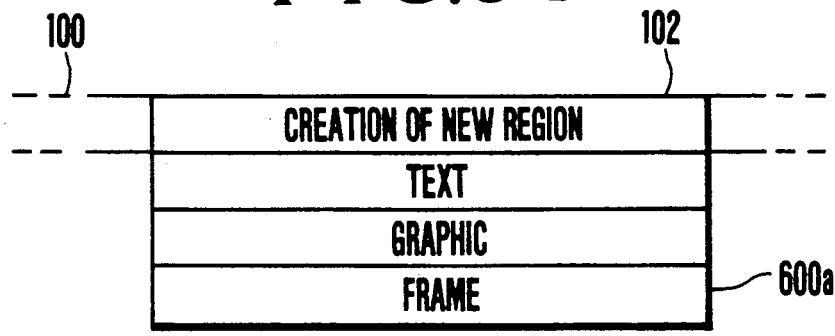
FIG.6B
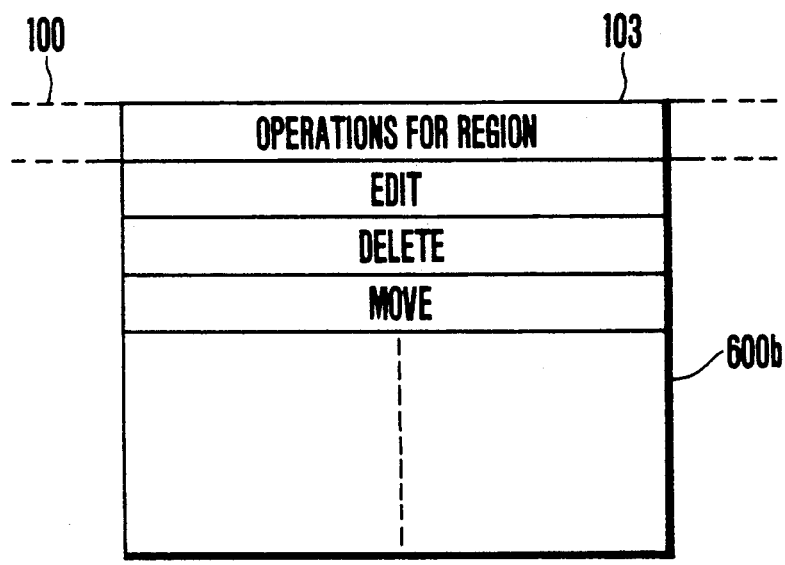
FIG.7
| TEXT | EDIT TASK NO. | LAYOUT DISPLAY TASK NO. |
|---|---|---|
| GRAPHIC | EDIT TASK NO. | LAYOUT DISPLAY TASK NO. |
| FRAME | EDIT TASK NO. | LAYOUT DISPLAY TASK NO. |

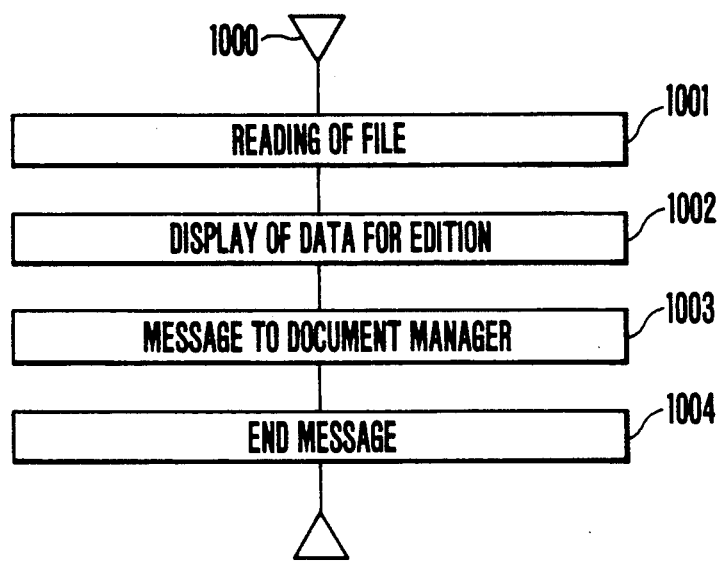
FIG.10
FIG.12A
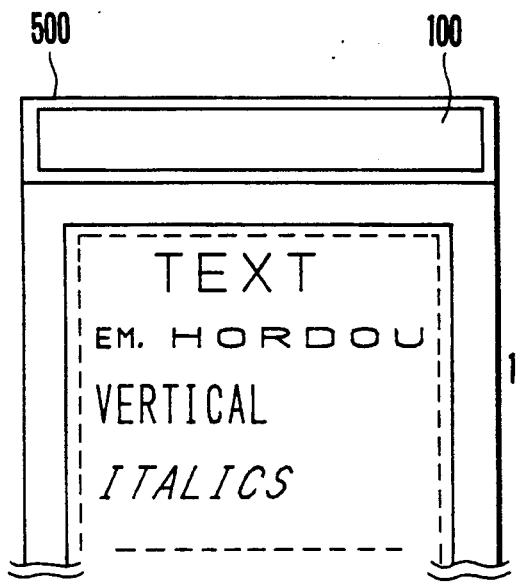
FIG.12B
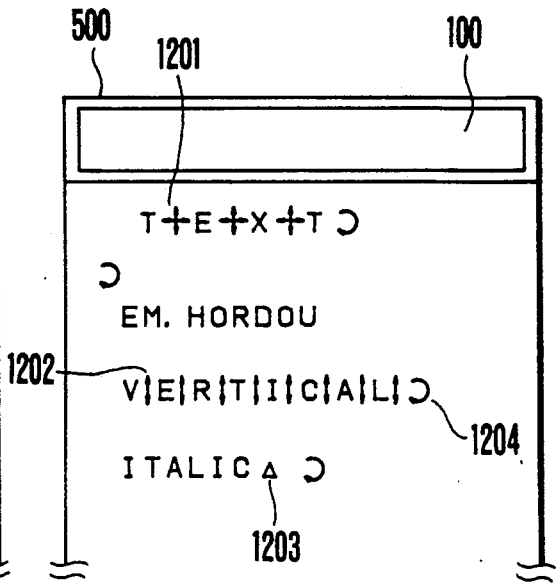

METHOD AND APPARATUS FOR EDITING DOCUMENTS INCLUDING A PLURALITY OF DATA OF DIFFERENT TYPES

BACKGROUND OF THE INVENTION

The present invention generally relates to a documentation system for processing document data such as text data, graphic data, framed data and other data for edition. More particularly, the present invention is concerned with a consolidated document editing system suited profitably for the consolidated edition of such a document in which a plurality of different document data such as the text data, graphic data and other data to be processed through different procedures coexist in a mixed fashion, while displaying a print image of the document on a display screen for allowing given data to be edited on the image as displayed.

As a typical one of the documentation systems known heretofore, the work station described in A. Kamitani "Jstar Work Station" published, by Maruzen Co., Ltd. of Japan of Apr. 25, 1986 is mentioned. In this work station, the document data such as text, graphic and other data are allocated by employing frames enclosing the data, whereon the data within the frames are edited on a frame basis. During the edition, one page of the document is displayed on a display screen in the form of a print image (this display of the print image will hereinafter be also referred to as the layout display), whereby the edition of the individual document data can be performed by viewing simultaneously the print image. By selecting the frame with a cursor, the document data within the selected frame is subjected to the processing for edition. By moving the frame, the page layout can be easily modified or altered. However, in the case of the work station of the prior art, severe constraints are imposed on the use of the frame such that the frame must be of a rectangular form of exclusive nature, that only the frame for the graphic data permits another frame to be additionally placed therein, and so forth, as described in the literature cited above (see pages 134 and 135). At this juncture, the phrase "frame of exclusive nature" means the attribute of the frame which inhibits another frame from being nested therein.

On the other hand, in a documentation system disclosed in U.S. Ser. No. 122,783 filed on Nov. 19, 1987 in the name of inventors including some of those of the present application, the document data are allocated to regions (equivalent to the frames mentioned above), wherein the data are edited on a region basis. With this documentation system, the page layout can be altered easily by moving the regions or through like procedure. It is noted that the constraints imposed on the region are much mitigated when compared with the work station described in the first mentioned literature. Although the region is equally required to be of a rectangular form, it is possible to designate the exclusiveness or non-exclusiveness of any given region for the given text data. Furthermore, overlapping or superposition of the different regions can be realized utterly arbitrarily. However, edition on the layout display screen is impossible, differing from the work station disclosed in the first mentioned publication. In other words, edition of the data within each region requires the display of a display-destined region. Consequently, the operator or user can not confirm the layout as a whole in the course of the edition performed for a region.

In the first mentioned work station, the severe constraints as imposed provided an obstacle for the arbitrary or comfortable edition of the document, in addition to the problem that inputting of characters to the layout display being generated requires a lot of time for displaying the inputted characters, making impractical the character entry at a high speed. On the other hand, in the second mentioned documentation system, the edition procedure must be interrupted when the layout display has to be generated for the purpose of confirmation, alteration or correction of the page layout or for the edition of different data, making the manipulation very troublesome.

SUMMARY OF THE INVENTION

It is therefore an object of the present invention to solve the problems of the prior art systems and provide a documentation system which can enjoy advantages of both the prior art systems mentioned above, i.e., the capability of manipulation for the edition on the displayed layout image on one hand, as in the case of the first mentioned prior art system, and the capability of edition while allowing arbitrary overlaps of the regions on the other hand, as in the case of the second mentioned prior art system.

Another object of the present invention is to provide a documentation system incorporating an edition mode in which inputting or entry of characters for edition can be performed at a high speed. In this mode, the inputted characters are displayed at a high speed without displaying the document layout.

In view of the objects mentioned above, there is provided according to an aspect of the present invention a documentation system which includes a document manage program for managing the structure of a document such as a layout thereof and others, a plurality of edit programs provided in correspondence with regions for editing the data within the relevant regions, and display programs for displaying the data as edited, wherein the programs mentioned above are caused to run independent of one other on an operating system (hereinafter also referred to as OS in abridgement). The document manage program is imparted with a function for activating the edit program and the display program. Further, message transfer means is provided between the document manage program and the edit program for realizing bidirectional message transfer therebetween. A message sender means is provided for sending a message from the display program to the document manage program. Further, a means for commanding the edit program to change over the regions is provided for allowing the operator or user to change over the regions in the course of edition processing.

In association with the edit program, a means for commanding a re-display is provided for sending a message information the document manage program of issuance of a request for the re-display.

In a preferred embodiment of the present invention, there are provided for the edit program a first program (mode) enabling the edition on the display layout image and a second program (mode) serving as an entry machine which permits high-speed character input and edition.

In the processing for edition, the edit program compares the input coordinates indicating positions or locations of document data for edition with the coordinates of the regions subjected to the edition and continues the edition processing when the input coordinates coincide with the coordinates within the region for which the edition processing is currently being executed. On the other hand, in case the input coordinates are outside of the region of concern (i.e. extra-region coordinates), the edit program issues to the document manage program through the message transfer means a message informing that the input coordinates are the extra-region coordinates, whereupon the edition processing comes to an end. When the operator commands the change-over of regions to be subjected to the edition, the edit program issues to the document manage program through the message transfer means a message informing of the region change-over, whereupon the edition processing executed until then is terminated.

Upon reception of the message of the extra-region coordinates, the document program determines on the basis of the input coordinates the region in which the input coordinates are located, whereupon the edit program corresponding to the document data for the determined region is activated. In case the document manage program can not determine the region on the basis of only the input coordinates, the operator then can command the change-over of regions, whereby the relevant region is determined on the basis of that command, being then followed by activation of the edit program corresponding to the determine region. As the situation in which the region can not be determined with the input coordinates only, there can be mentioned such a situation in which two or more regions overlap one another for the same input coordinates.

In case the overlap of the regions is simple, it is possible to change over the regions to be subjected to the edition merely by designating the desired region. On the other hand, when the inter-region overlap or superposition is complicated, the other region can be selected as the objective for the edition merely by commanding the change-over of the region.

However, when edition is to be performed for the data in the overlapping domain between the different regions, the edition processing for one of the regions in the overlapping domain may undesirably result in that the other region is processed for the edition concurrently. By way of example, when the text data in the one region is deleted, it may occur that the text data in the other region is undesirably deleted. For evading such inconvenience, it is proposed according to another aspect of the invention to provide a function for re-displaying the text data in any given region before the edition. More specifically, the edit program is so implemented as to be capable of issuing a message indicating a request for the re-display to the document manage program after the processing for edition has been performed. In that case, the edition processing is interrupted until a response message indicating the reception of the re-display request is received from the document manage program. The processing for edition is resumed upon reception of the response message. On the other hand, when the document manage program receives the re-display request message, it activates the display program corresponding to the region to be re-displayed. Subsequently, the display program is executed. The document manage program then waits for a response message indicating the completion of the re-display processing. This operation is repeated for all the regions to be re-displayed. Upon completion of the re-display for all the regions of concern, a message indicating this fact is sent to the edit program. The display program activated in response to the re-display request performs the processing for re-displaying the corresponding region. When the processing has been completed, a response message informing of the completed display is sent to the document manage program, whereupon the processing comes to an end. As will now be appreciated, it is possible to restore the images of other regions than those subjected to the edition processing by the edit program.

The first program (mode) for enabling the manipulation for edition on the layout image as displayed and the second program (mode) serving as the entry machine can operate independent of each other. By activating either one of the first and second programs (modes) at the time when the document manage program activating the edit program, edition can be performed on the layout image being displayed, while a high-speed entry operation can be realized, as the operator requires.

BRIEF DESCRIPTION OF THE DRAWINGS

FIGS. 1A to 1D and FIGS. 12A and 12B are views showing schematically contents as displayed on a display screen in the documentation system according to an embodiment of the present invention;

FIGS. 4, 7 and 13 are views for illustrating control data utilized in the documentation system;

FIGS. 6A and 6B and FIG. 15 are views showing examples of input means in the system according to an embodiment of the invention; and FIGS. 8 to 10, FIGS. 11A and 11B, FIG. 14 and FIG. 16 are flow charts showing various processings which can be performed in the documentation system according to an embodiment of the invention.

DESCRIPTION OF THE PREFERRED EMBODIMENTS

Now, the present invention will be described in detail in conjunction with preferred embodiments thereof by reference to the accompanying drawings.

Figure 2A:
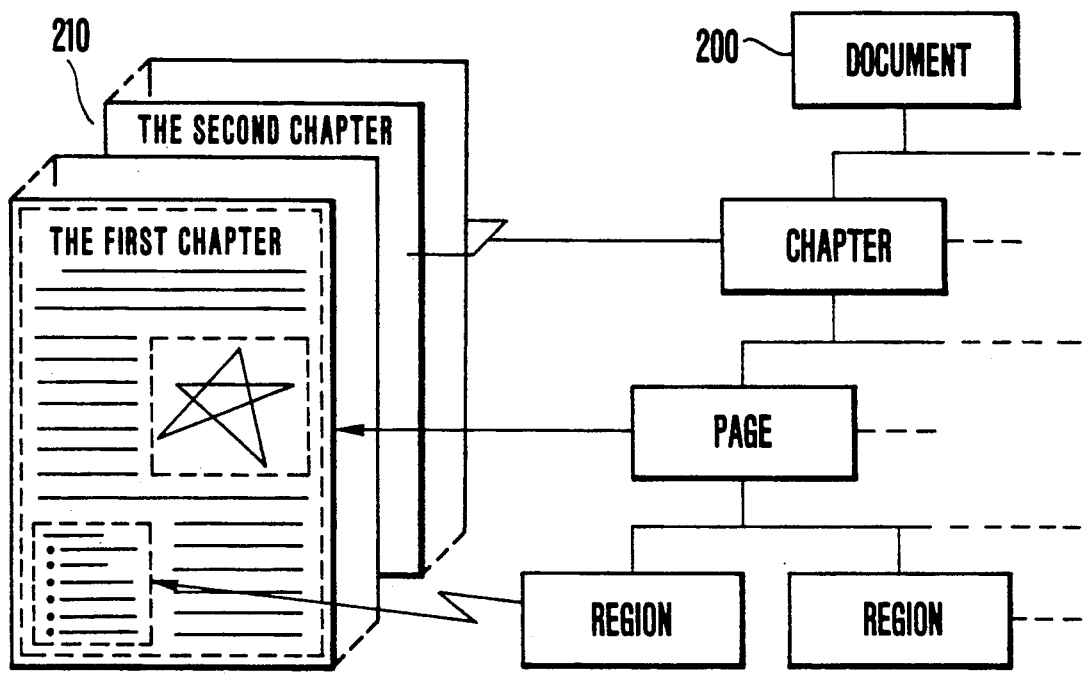
FIGS. 2A and 2B are diagrams for illustrating a structure of document data employed in the documentation system according to an embodiment of the invention.

FIG. 2A shows a logic structure 200 of document data as adopted in the documentation system according to an embodiment of the present invention together with an example of document 210. The document 210 includes a plurality of chapters each of which in turn includes a plurality of pages. Further, each page includes a plurality of regions, wherein the layout of a page is determined in dependence on the positions and sizes of the regions included in that page. Each of the regions is assigned with one of text data, graphic data and enclosed or framed data (hereinafter also referred to as region data in general). With the phrase "enclosed or framed data", it is intended to mean the text data which is enclosed by a frame (exclusive of the graphic data) and inserted in the body of text. Further, the graphic data means the data enclosed by a frame in which the graphic data are present. In the following description of the illustrated embodiments of the invention, the assumption is made that only the three types of data mentioned above are to be dealt with. It is however apparent that such limitation of the data species is only by way of example and immaterial to the essence of the invention. It is an easy and simple matter for persons skilled in this art to expand the capability of the documentation system according to the illustrated embodiment of the invention so that other data such as image data and the like can be handled as the region data in addition to the text data and the graphic data.

Figure 2B:
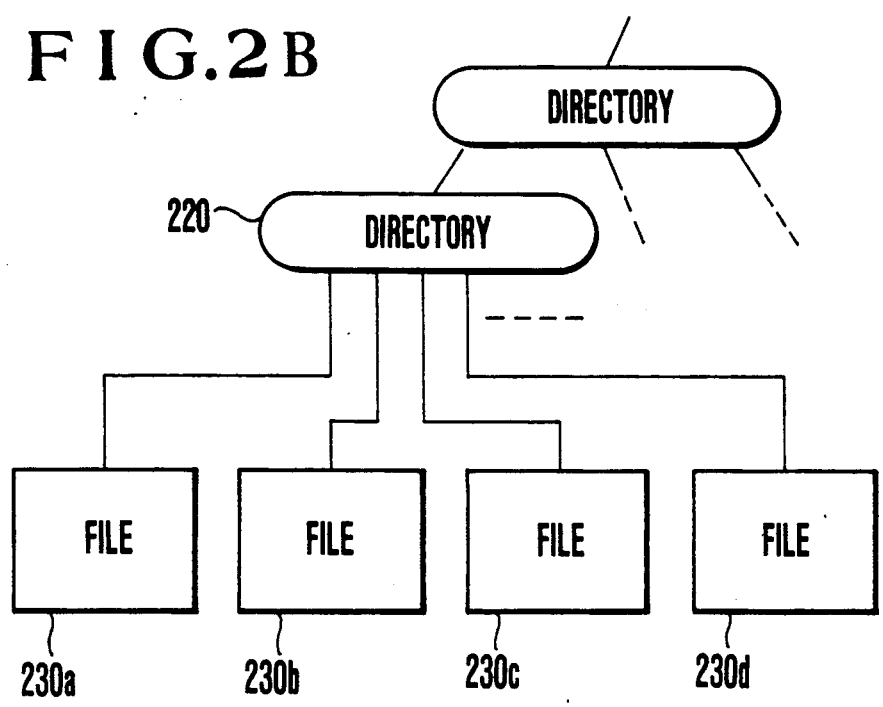

The document data are composed of the data of the individual regions and the structure data defining the logic structure. In the case of the instant embodiment of the invention, the structure data and the individual region data are stored separately in independent files, respectively. More specifically, referring to FIG. 2B showing a hierarchical file structure, a directory 220 at the bottom level corresponds to one document and has a plurality of files 230a to 230d belonging thereto, in which the structure data and the region data of different types are stored separately from one another. By way of example, the file 230a stores therein the structure data with the files 230b, 230c and 230d storing the text data, graphic data and the frame-enclosed data, respectively.

Figure 3:
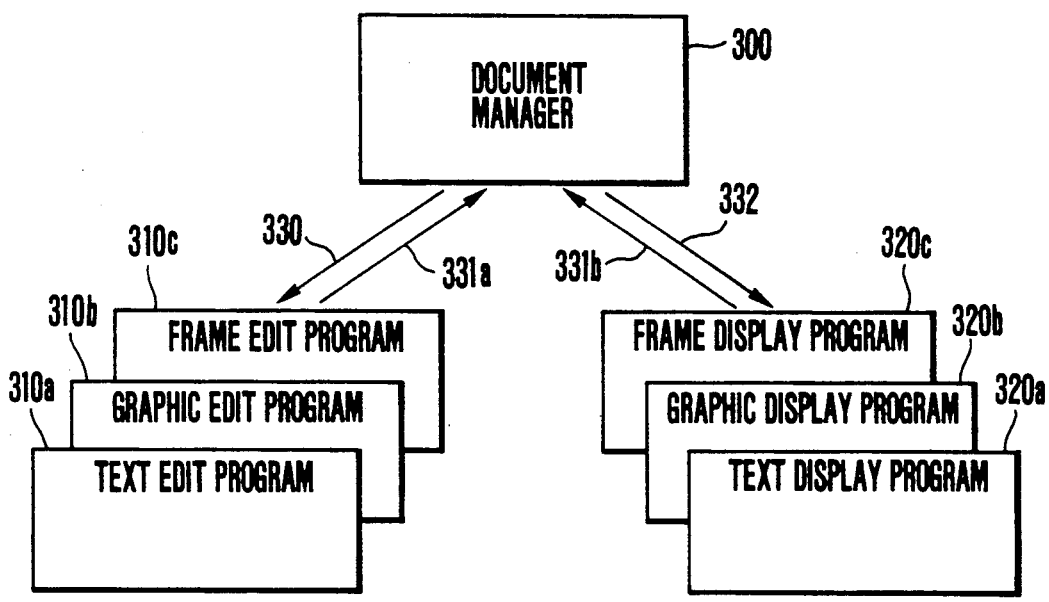
FIGS. 3 and 17 are views showing program structures, respectively, which can be adopted in the documentation system according to the invention.

Referring to FIG. 3, a document edit program is composed of a document manager 300, an edit program 310 and a layout display program 320. The document manager 300 provides the user with the facilities for the edition such as alteration of the layout and composition of the chapter and at the same time serves as a program for managing the edit program 310 and the layout display program 320 in a consolidated manner.

Figure 4:
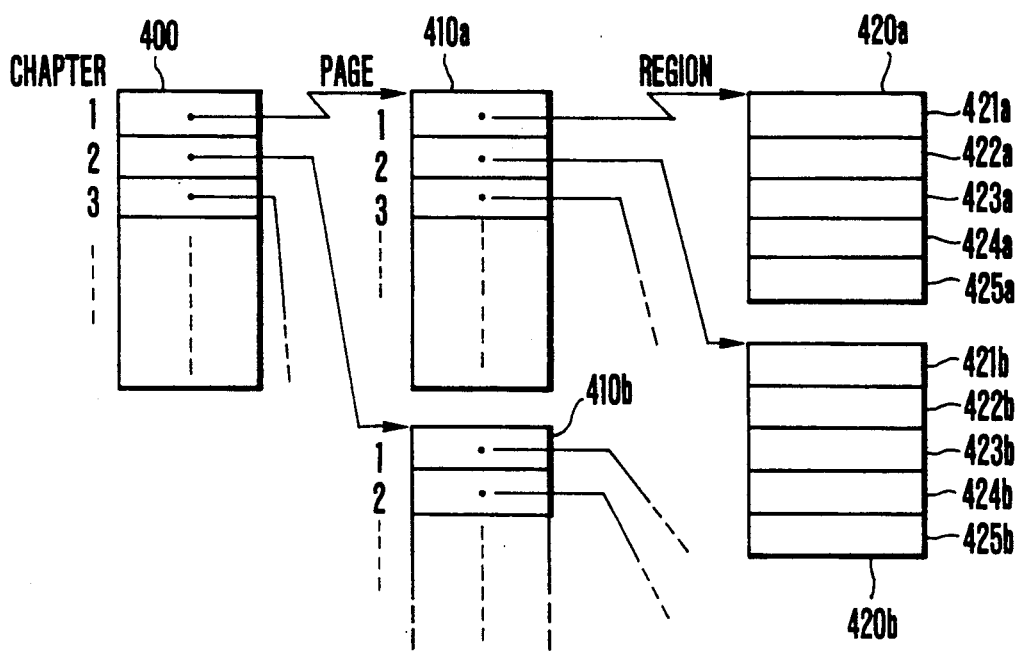

FIG. 4 shows an example of the structural data. As can be seen in the figure, the structural data is composed of a chapter manage table 400, page manage tables 410a, 410b, etc. and region manage tables 420a, 420b, etc. The chapter manage table 400 manages pointers to the associated page manage tables 410a, 410b, etc., while each of the page manage tables 410a, 410b, etc. manages pointers to the region manage tables 420a, 420b, etc. for the regions included in the associated page. Each of the region manage tables generally denoted by 420 lists therein region (identification) numbers 421, data species 422 representing discriminatively the text data, graphic data and the frame-enclosed data, positions and sizes 423 of the regions, region attributes 424 and the file names 425 in which the data allocated to the regions are stored. The region attributes are of significance only to the graphic data region and the framed data region and indicate whether these regions are exclusive or nonexclusive. Parenthetically, the phrase "graphic data region" means the region allocated with the graphic data. Similarly, the text and framed data regions means the regions allocated with the text data and the frame-enclosed data, respectively. In the exclusive region, no text data can be entered. Accordingly, in the exclusive region, there occurs no overlap between the text data and the data within the exclusive region. On the other hand, in the non-exclusive region, the text data can be entered, whereby the text data may overlap the data within that non-exclusive region. The document manager 300 serves to update the structure data shown in FIG. 4 in accordance with the commands such as deletion and/or addition of chapter and/or page, move and/or deletion of the regions, and others. Since the processings performed by the document manager 300 bears no direct relevance to the present invention, any further description of this manager 300 will be unnecessary.

Referring to FIG. 3, the edition program 310 is composed of a text edit program 310a, a graphic edit program 310b and a frame edit program 310c which are independent of one another. These edit programs 310a, 310b and 310c read out and edit the region data stored in the associated files 230 (FIG. 2B). Each of the edit programs collectively denoted by a numeral 310 processes for the edition only one designated region data stored in one of the files 230 independent of the structure data and the other region data. Similarly, the layout display program 320 is composed of a text layout display program 320a, a graphic layout display program 320b, a frame layout display program 320c which are independent of one another, as shown in FIG. 3, and serves to read out the region data from the designated files 230 for displaying a print image of the read data on a layout image being displayed.

The various programs mentioned above run on a multi-task operating system (OS) and are managed by the OS as the independent tasks upon execution thereof. Accordingly, in conjunction with the explanation of the operations of the individual programs, they are called the tasks instead of the programs. Since the tasks can be executed on the conventional general-purpose multi-task operating system (OS) of which functions and structure are known in the art in the case of the illustrated embodiment of the invention, description of the multi-task OS is herein omitted. Further, the functions such as task activation/termination, inter-task message transfer and others are very common functions of the multi-task OS and well known in the art. Accordingly, description about these functions as well as realization thereof are also omitted herein.

Relationships among the individual tasks are represented by arrowhead lines 330, 331a, 331b and 332 in FIG. 3. More specifically, the arrowhead line 330 indicates that the document manager 300 activates the edit tasks 310 or that messages are issued to the edit tasks 310. The arrowhead line 331a or 331b represents that the edit tasks 310 or the layout display tasks 320 issue and send messages to the document manager 300. Finally, the arrowhead symbol 332 represents activation of the layout display tasks 320 by the document manager 300.

In the following table 1, the contents and types of the messages are listed.

TABLE 1

| Type of messages | Contents |
| --- | --- |
| 330 | Completion of layout alternation |
| 331a | End of processing, extra-region coordinates, change-over, change of page, scrolling |
| 331b | Completion of layout display |

The messages 331a are issued by the document manager 300 and sent to the edit tasks and include a "processing end" message informing that the edition terminating command is issued in the course of the edition, an "extra-region coordinate" message indicating that the input coordinates as designated are outside of the region being subjected to the edition, a "change-over" message indicating that the change-over of region is commanded, a "scrolling" message indicating the scrolling command, a "page change message" indicating the necessity of changing the page, and so forth. The message 330 is issued by the document manager 300 in response to the message 331a to inform the edit tasks 310 that the processing for updating the layout image has been completed in accordance with the content of the message 331a. The message 331b is issued by the layout display task 320 to the document manager 300 for information that the processing for the layout display as commanded has been completed.

Before entering into the description of the processing performed by each task, a method for edition performed on the layout display image will be elucidated with reference to FIGS. 6A and 6B along with FIGS. 1A to 1D.

FIGS. 1A, 1B, 1C and 1D are views showing examples of the layout display generated in the course of the editing operation by the documentation system according to the illustrated embodiment of the present invention. In the figures, a reference numeral 100 documents a menu bar displaying a list of available editing functions to be selected by the operator, wherein a numeral 101 denotes a change-over function, 102 denotes a new region creating function, 103 denotes a region manipulating function and a numeral 104 denotes an end function. Further, a numeral 120 denotes a layout display representing one page of a document being edited. A numeral 121 denotes a text region on the page being displayed, 122 denotes a graphic region, and a numeral 123 denotes an frame-enclosed or framed region. A numeral 110 denotes a cursor for indicating locations on the CRT screen, the position of the cursor 110 being designated with the aid of an external input unit such as a mouse or the like.

Figure 1A:
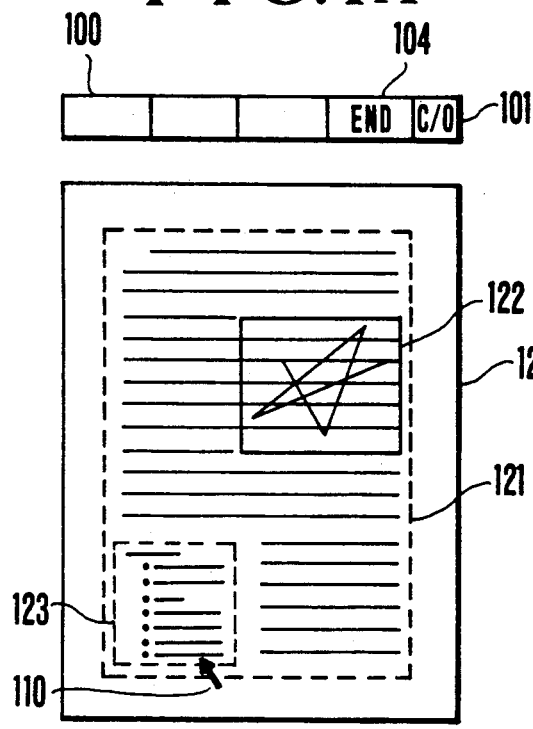
Figure 1B:
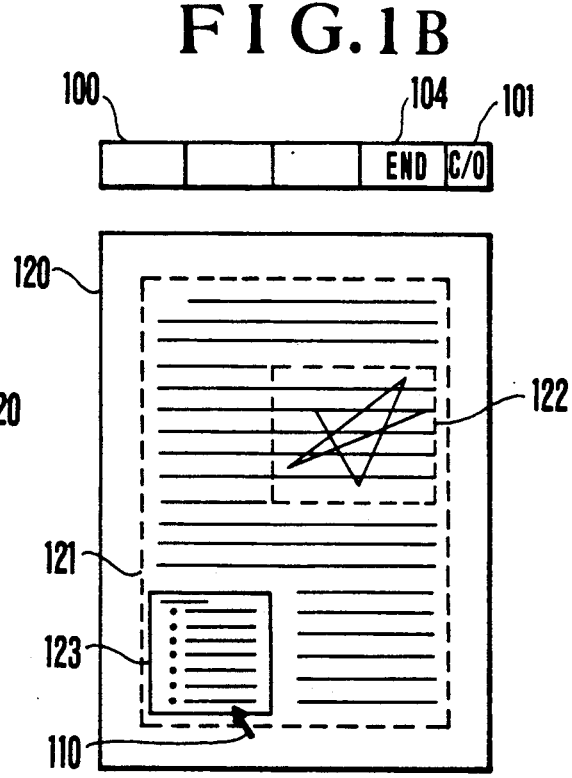
Figure 1C:
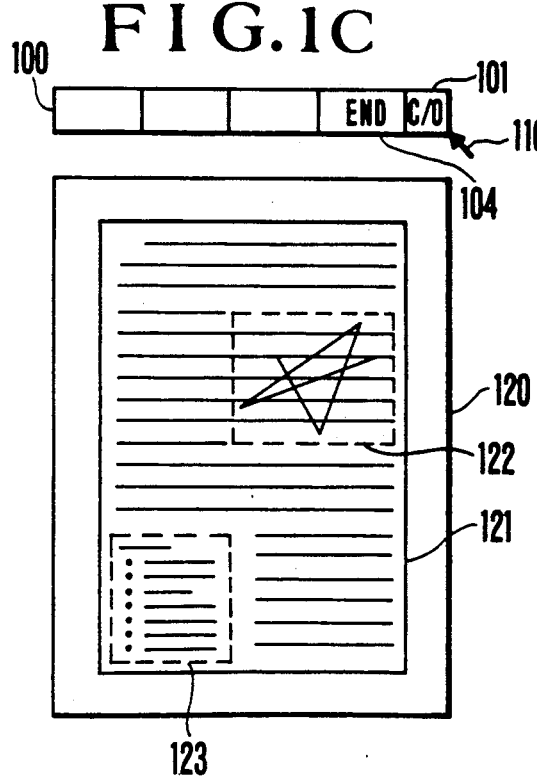
Figure 1D:
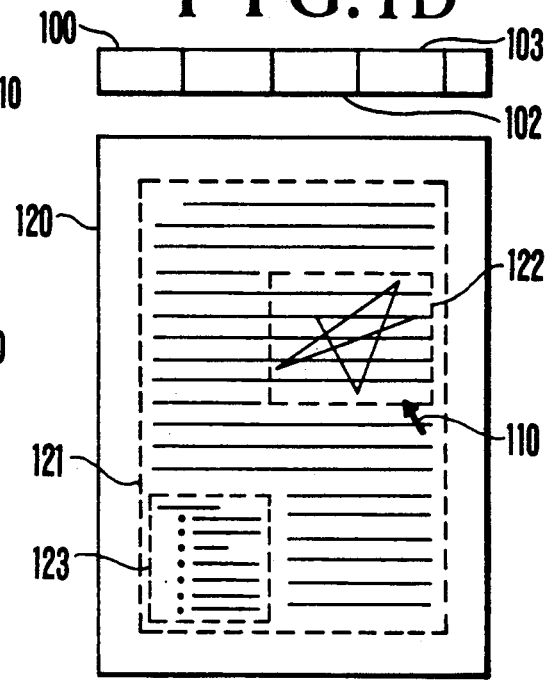

The layout display shown in FIG. 1D is generated in the state where the document manager 300 is being activated and waiting for the input by the operator. At this juncture, it is assumed that the operator commands a correction or modification of an edited document stored in a floppy disc. Then, the document manager 300 and the layout display tasks 320 are sequentially activated, wherein the state shown in FIG. 1D is achieved when the layout display processing has been completed by the layout display tasks 320.

When the operator designates a region 122 with the cursor 110, moves the cursor 110 to the menu bar 100 and selects the region manipulating function 103, then a pull-down menu 600b shown in FIG. 6B is displayed. When the function "EDIT" of the pull-down menu is selected by the operator, the display of the state shown in FIG. 1A is generated. In this state, the graphic edit task 310b is operating, wherein a menu for the graphic edition is displayed in the menu bar 100. In FIG. 1A, the region being subjected to the edition is indicated as enclosed by a thick solid line with the other regions being indicated as enclosed by broken lines. In this conjunction, it should be mentioned that this type of display scheme is not essential to the present invention. All the regions may equally be displayed by using the same kind of line or those regions of no concern may be spared from the display.

When the new region creating function 102 on the menu bar 100 is designated in the state shown in FIG. 1D, a pull-down menu 600a shown in FIG. 6A is displayed. When one of "TEXT", "GRAPHIC" and "FRAME" is selected in this pull-down menu 600a, a corresponding region is newly displayed on the screen 120. By designating the size and the location of this region, there is established a new text region or a frame region or other containing no document data yet.

In the state shown in FIG. 1A, graphic edition can be performed within the graphic region 122. When the position indicated by the cursor 110 lies within the graphic region 122, the graph edit task 310b performs the graphic edition processing. Of course, the operator can input other desired edit functions through corresponding designation of the menu bar 100 with the cursor. As the means for inputting the edit functions, a keyboard may be employed in addition to the selection from the menu bar 100 by means of the cursor. On the other hand, when the frame-enclosed region 123 is designated with the cursor 110, the region 123 is then subjected to the processing for edition, whereupon the display state shown in FIG. 1B is generated with the frame edit task 310c being activated. At that time, a frame edition menu is displayed on the menu bar 100.

As will be appreciated from the above, editions of the document data of different types or species can be sequentially performed with the edit tasks 310 being changed over by designating the regions on the layout display screen. As an example, assume that the edition is to be performed for the text region 121 in the state shown in FIG. 1C. In this state, the graphic region 122 and the frame region 123 are superposed on the text region 121. Consequently, there may arise such situation that difficulty is encountered in deciding whether the input coordinates designated by the operator with the cursor 110 indicate a position within the text region 121 or within other regions (122, 123). More specifically, in the case of the example illustrated in FIG. 1, the attribute of the graphic region 122 is assumed to be non-exclusive (i.e. capable of being superposed with other region), wherein the text region 121 and the graphic region 122 are displayed in superposition (overlap). Accordingly, when a position within the overlapping domain is designated by the cursor, the apparatus will then encounter extreme difficulty in deciding whether the designated position lies in the text region 121 or in the graphic region 122.

For coping with the problem mentioned above, there is provided according to a teaching of the present invention the change-over function 101 in the menu bar 100 for each of the edit tasks 310 with a view to making clear which of the regions is designated for the edition. When the change-over function 101 is designated by the cursor, the document manager 300 operates in response thereto, whereby the state shown in FIG. 1D is displayed to allow the various functions to be selected by consulting the new region create menu 102 or the region processing menu 103, as described hereinbefore. More specifically, designation of the region for the edition in the domain where the graphic region 122 overlaps the text region 121 in the state shown in FIG. 1D is carried out in the manner mentioned below. When the overlapping domain or area is designated by the operator with the cursor, the system displays the graphic region 122 by enclosing it with the solid line. When the operator commands the execution of edition immediately thereafter with the mouse, edition for the graphic region is started. When the operator designates the overlapping domain twice successively, the text region and the graphic region are displayed as enclosed by the solid line frame. Assuming that the execution of the processing for edition is commanded by the operator with the mouse in this state, the system then decides the command as the invalid input and does not accept the command. On the other hand, when the operator designates the overlapping area with the cursor in the state where both the regions are displayed as enclosed by the solid lines, the system clears the solid line enclosure display and displays only the text region by enclosing it with the solid line. When the execution is commanded by the operator with the mouse in this state, edition for the text region is started.

Figure 5A:
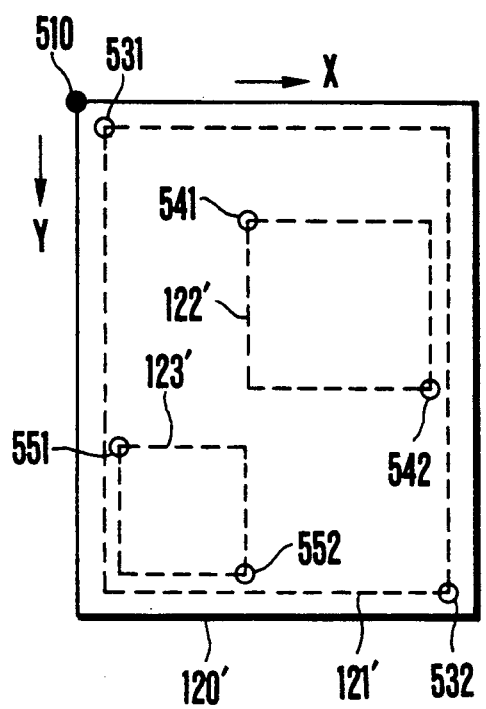
FIGS. 5A, 5B and 5C are views for illustrating coordinate systems used in the documentation system according to an embodiment of the invention.
Figure 5B:
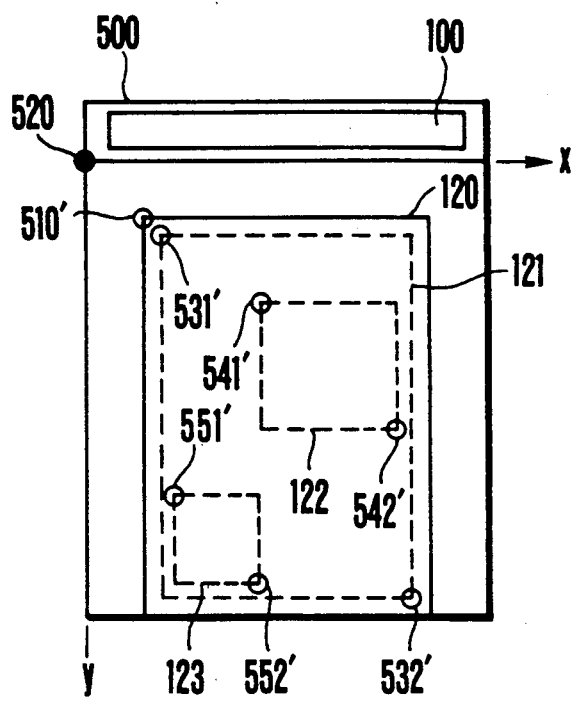
Figure 5C:
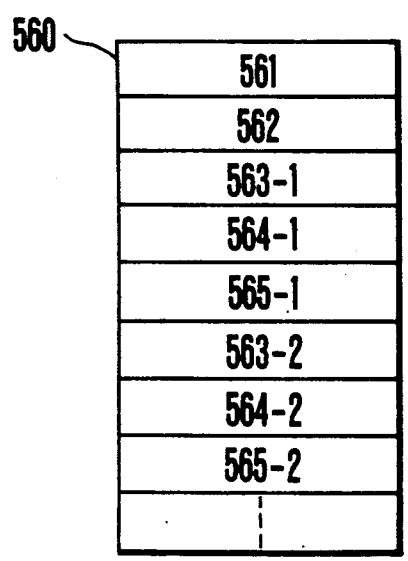

Next, description will be made of the processings executed by the various tasks with reference to FIG. 5 and FIGS. 7 to 10. FIGS. 5A to 5C and FIG. 7 are views for illustrating the managing data used for the management of the regions by the document manager 300 as well as in the course of edition. The document manager 300 manages or controls the position and the size of a region with the aid of a form coordinate system. In FIG. 5A, reference numeral 120' denotes a form for the edition. The form coordinate system is a dot coordinate system having the origin 510 located at the upper left corner of the form, as shown in FIG. 5A. With this coordinate system, the positions and the sizes of regions 121' to 123' are managed by making use of the upper left corner coordinates (531, 541, 551) and the lower right corner coordinates (532, 542, 552) of the respective regions. These coordinates are stored in the region manage tables 420 at rows 423. FIG. 5B shows the layout of the form displayed on the display screen 500 on which a coordinate system having the origin 520 at a upper left corner point located beneath the region for the menu bar 100 is established, as shown in FIG. 5B. In this figure, the reference numerals affixed with primes denote the points of the coordinate system on the display screen 500 which correspond to those on the form coordinate system, respectively. By way of example, numeral 510' denotes the origin of the form coordinate system and other numerals with the prime denote the coordinates of the upper left corners and the lower right corners mentioned previously in conjunction with FIG. 5A. The document manager 300 includes a coordinate data table 560 (shown in FIG. 5C) for managing the regions displayed on the display screen 500 during the edit processing. In the data table 560, numeral 561 denotes the identification number of the region for which the edition is being performed, 562 denotes an area in which a reduction/magnification ratio for the display is held, and 563-i (i=1, 2, 3) denotes an area in which the identification number i of the region stored at 421 is placed, and 565-i denotes areas for holding the upper left corner and the lower right corner of that region. In the case of the example illustrated in FIG. 5A, the coordinates 531' and 532' are held at 565-2 with the coordinates 541' and 542' being held at 565. Finally, areas 564-i hold the species of the data (text, graphic, frame data) allocated to the region having the identification number i.

Next referring to FIG. 7, a reference numeral 700a denotes a program manage table for associating the edit task 310 and the layout display task 320 with each other, which table 720a is contained in the document manager 300. In a column 701 of the table 720a, species of the data for edition are stored, while edit task identification numbers are placed in a column 702 with the layout display task numbers being stored in a column 703.

Figure 8:
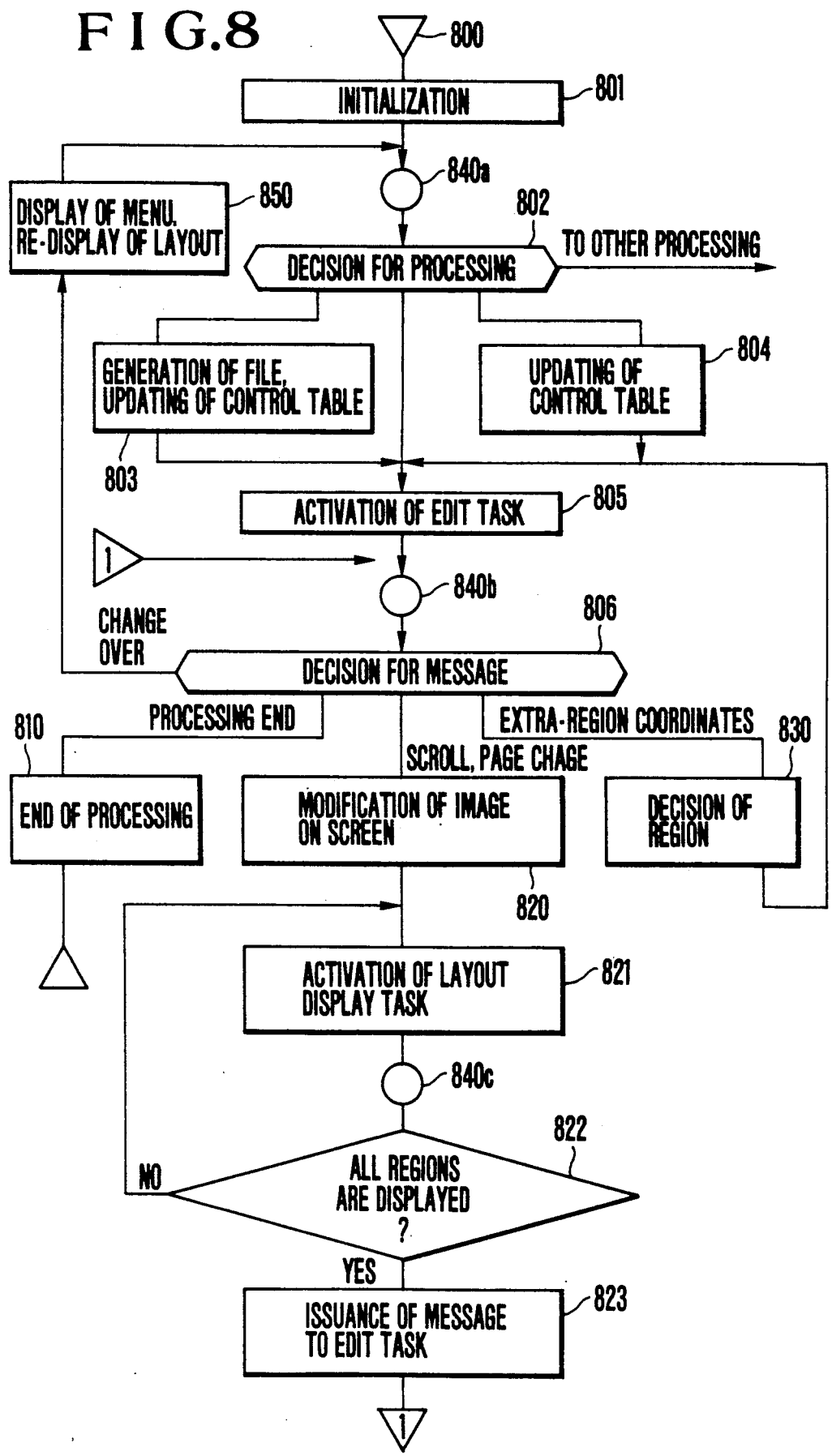

FIG. 8 is a flow chart illustrating the processing performed by the document manager 300. Upon activation of the document manager 300, an initialization step 801 is first executed, wherein the data for management and work areas are initialized while the menu is displayed on the menu bar 100. At that time, the layout of a page to be subjected to the edition is displayed on the display screen 500, and the reduction/magnification ratio for the display is loaded in the coordinate data 560 at the area 562. When a region to be processed has been established, the identification number of that region is placed at the area 563 of the table 560, while the species of the data to be allocated to that region is placed at the areas 564 with the coordinates of that region being placed at the areas 565. Subsequently, the document manager 300 is in the state waiting for the inputting of command by the operator (step 840a). When one of the functions explained hereinbefore with reference to FIGS. 6A and 6B is inputted, the document manager determines the content to be processed in accordance with the function as commanded (step 802). In case the inputted function is to create a new region, the files 230 for the data for edition described in conjunction with FIG. 2B are generated and the region manage table 420 is updated by adding thereto the structural data described hereinbefore by reference to FIG. 4 at a step 803. Further, the identification number and the coordinates of the new region are additionally entered in the coordinate data table 560 at the areas 563 and 565 while the species of the document data as designated are additionally entered at the area 564. Further, the number of the region to be newly created is stored at the area 561 of the table 160. When a change occurs in the layout due to the exclusiveness of the region or for other reasons, the layout display is correspondingly altered. When the edit function is selected in the pull-down menu corresponding to the region processing function 103, the identification number of the designated region is placed in the coordinate data table 560 at the location 561. Indexing of the region identification number can be realized by comparing the coordinates designated by the cursor 110 with the region coordinates held at the area 565 of the coordinate data table 560. When deletion or move of a region or other function is selected or commanded, the processing corresponding to that command is performed. However, since these processings bear no direct relevance to the present invention, they are omitted from illustration in FIG. 8.

At a processing step 805, the region identification number i held in the coordinate table 560 at the location 561 is read out while the species of the document data allocated to the region of the number i is retrieved from the area 564-i in the table 560. At the same time, the edit task identification number corresponding to the document data of concern is determined by consulting the data stored in the program manage table 700a at the columns 701 and 702 and a request for activation of the task is issued to the OS. In that case, the reduction/magnification ratio (562) as well as the coordinates (565) of the region to be displayed and the name (425) of the file storing the data for edition are sent to the edit task 310 to be activated. Thereafter, the document manager 300 waits for reception of the message from the edit task 310 at a step 840b, while the edit task or program 310 as activated starts its task.

Upon reception of the message, the document manager 300 restarts its operation. At a processing step 806, the document manager 300 makes a decision for the message. When the message is the "CHANGE-OVER" function, the menu for the function "CHANGE-OVER" is displayed, being attended with the re-display of the layout. At that time, frames for all the regions may be displayed to show definitely the positions of the frames. The document manager 300 is set to the state waiting for the inputting of a command at a step 840a.

When the processing of the message comes to an "END", the edition processing is terminated by executing a termination or end processing such as issuance of an end message to the OS (step 810).

In the case of the message of "EXTRA-REGION COORDINATES", the coordinates designated by the cursor 110 are made available as parameters. The document manager 300 then compares the coordinates resulting from the processing step 830 with the region coordinates 565 contained in the coordinate data table 560 to thereby index the region as designated, whereupon the identification number of that region is placed in the table 561 as the area 561 to execute the edit task activation processing step 805.

When the processing commanded by the message is "SCROLL" or "PAGE CHANGE", the content displayed on the CRT screen 500 is altered or changed at a processing step 820. When the message is "SCROLL", information for the direction and magnitude of the scrolling is supplied from the edit task as the parameters for this message, whereupon the image on the screen is correspondingly moved. In the case where the message is "PAGE CHANGE", the whole form image on the display screen 500 is abandoned. Subsequently, the manage data for all the regions constituting a next page are searched out from the page manage table 410 for the structure data, whereupon the region identification numbers 563 of the coordinate data table 560 as well as the data species 564 corresponding to the regions 563 are again set. Then, the form frame is displayed.

At a processing step 821, the regions of the layout displayed again are sequentially compared with the region coordinates 565-i. When overlap of the regions is present, the layout display tasks 320 corresponding to the regions are retrieved from the program manage table 700a to issue an activation request to the OS (except for the region which is currently subjected to the edition). At this time, the parameters as required for the activation are the region coordinates 565-i, the reduction/magnification ratio 562 and the file name 425 of the file for the corresponding data for edition. After the activation, the document manager 300 waits for the message of "LAYOUT DISPLAY COMPLETED" from the layout display task 320 at a step 840c. Upon reception of this message, decision is made as to whether all the regions have completely been displayed (step 822). When any region remains to be displayed, the processing routine from the step 821 to the step 822 is repeatedly executed. When the display of all the regions has been completed, a message "LAYOUT ALTERATION COMPLETED" is issued to the edit task 310 at a step 823. The document manager 300 assumes then the state waiting for the message from the edit task 320 (step 840b).

The layout display and alteration processings at the steps 801, 803 and 850 are performed through the same procedure as in the case of the processing steps 821 to 822.

Figure 9:
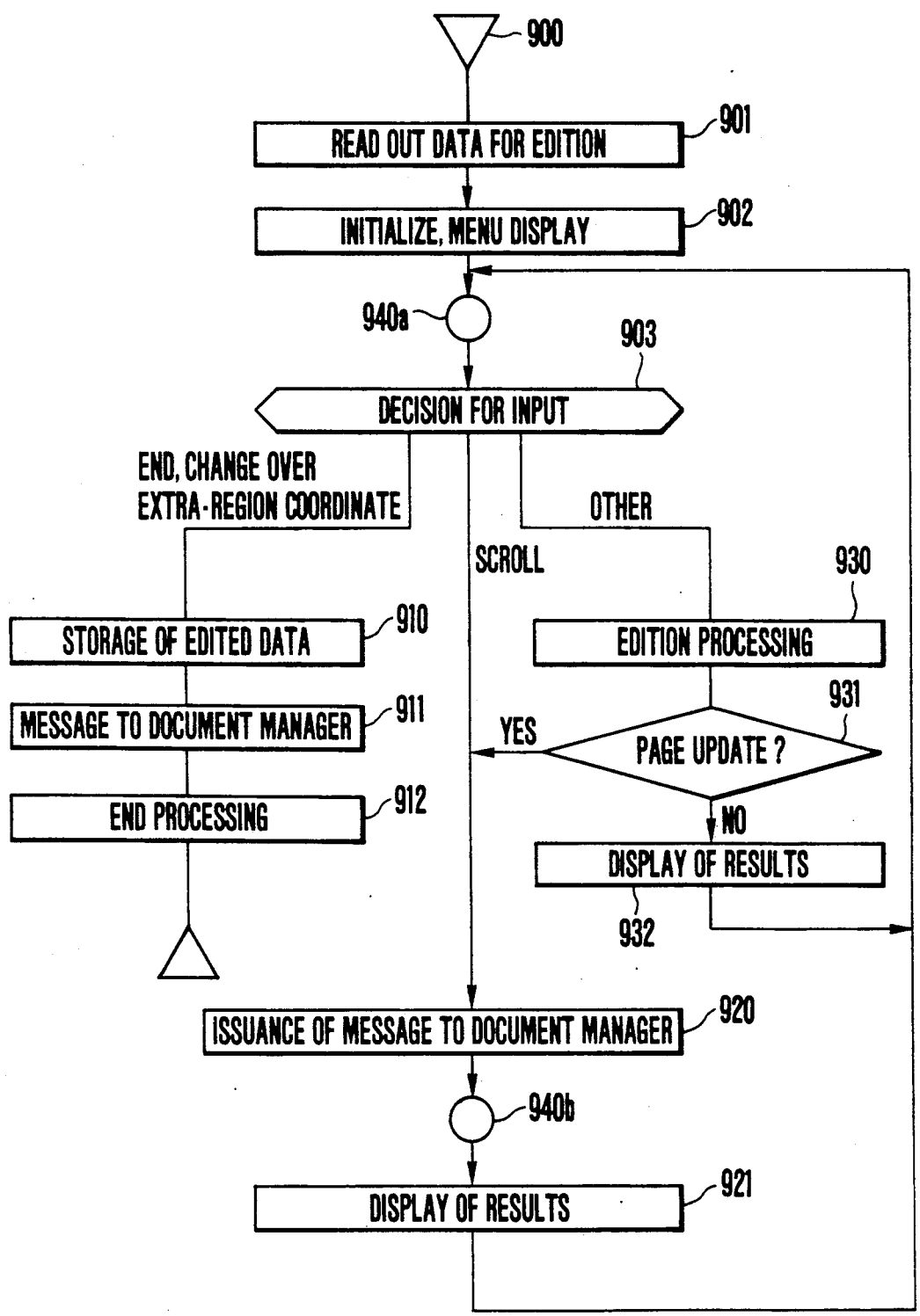

FIG. 9 is a flow chart illustrating the processing procedure of the edit task 310. Upon activation of the edit task 310 in response to the activation request from the document manager 300, the name of the file storing the relevant document data is determined on the basis of the parameters for the activation, being followed by reading out the data for the edition from the relevant file 230 (step 901). At a processing step 902, initialization of the work data utilized internally and the menu display on the menu bar 100 are performed. In case a new region is to be created, initialization of the document data has to be performed, since the file 230 as created for storing the document data for the new region is not loaded with the document data yet. At a step 940a, the edit task 310 assumes the input awaiting state. At a step 903, decision is made as to the content of the input, if present. When the input is the function 104 or 101 indicating the end (termination) or the change-over or when the coordinate values designated by the cursor 110 are not within the range defined by the region coordinates 565 transferred as the parameters for the activation, the document data are first stored in the file 230 at a processing step 910, being followed by a processing step 911 where the corresponding message is issued to the document manager 300. Next, an "END" processing (step 912) such as issuance of the end message to the OS is performed, whereon the processing comes to an end. At that time, since message is issued to the document manager 300 waiting for reception of the message, the OS sets the document manager 300 to the operating state. Thus, the processing by the document manager 300 is restarted.

When the scroll is designated with a scroll key or a scroll bar, a corresponding message is issued to the document manager 300 at a processing step 920. Subsequently, the edit task 310 is set to the message awaiting state at a step 240b. The OS sets the message awaiting document manager 300 to the operating state to thereby restart the processing by the document manager 300. Thus, the edit task 310 to which the message is sent from the document manager 300 restarts the processing from the step 921 at which a portion to be newly displayed as the result of the scrolling is displayed, whereon the edit task 310 assumes the input awaiting state at a step 940a.

For the input of other cursor coordinates and a key code, the edition processing corresponding to the input is performed at a step 930, the result of which is displayed at a step 932. In that case, when the result of the above processing is decided to be continued to a next page at the decision step 931, as is often experienced in the edition of a text, a corresponding message is issued to the document manager 300 at a processing step 920. Subsequently, at a step 921, the data for edition for the new page are displayed together with the result of the processing step 930. The edit task 310 translates the input coordinates into the relative coordinates in the coordinate system having the origin located at the upper left corner of the region on the form coordinate system on the basis of the region display coordinates 565 and the reduction/magnification ratio 562 supplied as the activation parameters, and holds the relative coordinates as the data for the edition. Upon generation of the display, the coordinates of the data for edition are translated into the coordinates of the display screen coordinate system on the screen 500.

FIG. 10 shows a flow chart for illustrating a flow of processings performed by the layout display task 320. When the layout display task 320 is activated by the document manager 300, the document data are read out from the relevant file 230 identified by the file name 425 supplied as the parameter for activation at a processing step 1001. Subsequently, at a step 1002, the coordinates of the document data are translated into the coordinates of the display screen coordinate system on the CRT screen 500 on the basis of the reduction/magnification ratio 562 and the region display coordinates 565 supplied as the parameters for the activation, whereupon the data for edition are displayed in the region designated by the table content 565. When the display of the data for edition has been completed, the message "LAYOUT DISPLAY COMPLETED" is issued to the document manager 300 at a step 1003, while an end message is issued to the OS at a step 1004, whereupon the processing of the layout display task comes to an end.

As will be appreciated from the foregoing explanation, according to the teachings of the present invention incarnated in the illustrated embodiment described above, it is possible to select any desired region as the objective for the edition no matter how complicatedly the regions constituting a page overlap one another, when a document having the document structure 300 shown in FIG. 2 is to be edited on the layout display screen. Besides, when the inter-region overlap relation is simple, the region for the edition can be changed over simply by designating the desired region, whereupon the corresponding program can immediately be activated, thus simplifying extremely the manipulation or operation required for the operator, to great advantage.

As another advantageous effect achieved by the illustrated embodiment, due to the independence in respect to the program structure among the individual edit and layout display programs, the addition of new document edit functions can be realized very conveniently. By way of example, in case an English document edit function capability is to be implemented in addition to a Japanese document edit function, the English document edit program and the English document layout display program can be developed utterly independent of the structure of the other edit programs and the data for edition, whereby the efficiency in development of the programs for the English documents can be improved significantly. Further, the document prepared by the system before the addition of the English document edit function can equally be edited by the updated system, whereby the document compatibility can be ensured at the document level of a much sophisticated multi-function documentation system.

In the case of the embodiment of the documentation system according to the invention described so far, re-displaying of the region except for the region being subjected to the edition can not be enabled unless the command for the change-over is issued. Consequently, when a graphic image is deleted in the course of the edition of the graphic region 122 shown in FIG. 1A, by way of example, a part of the text data is also erased simultaneously, wherein the data as erased can not be restored until the change-over is commanded.

Figure 11A:
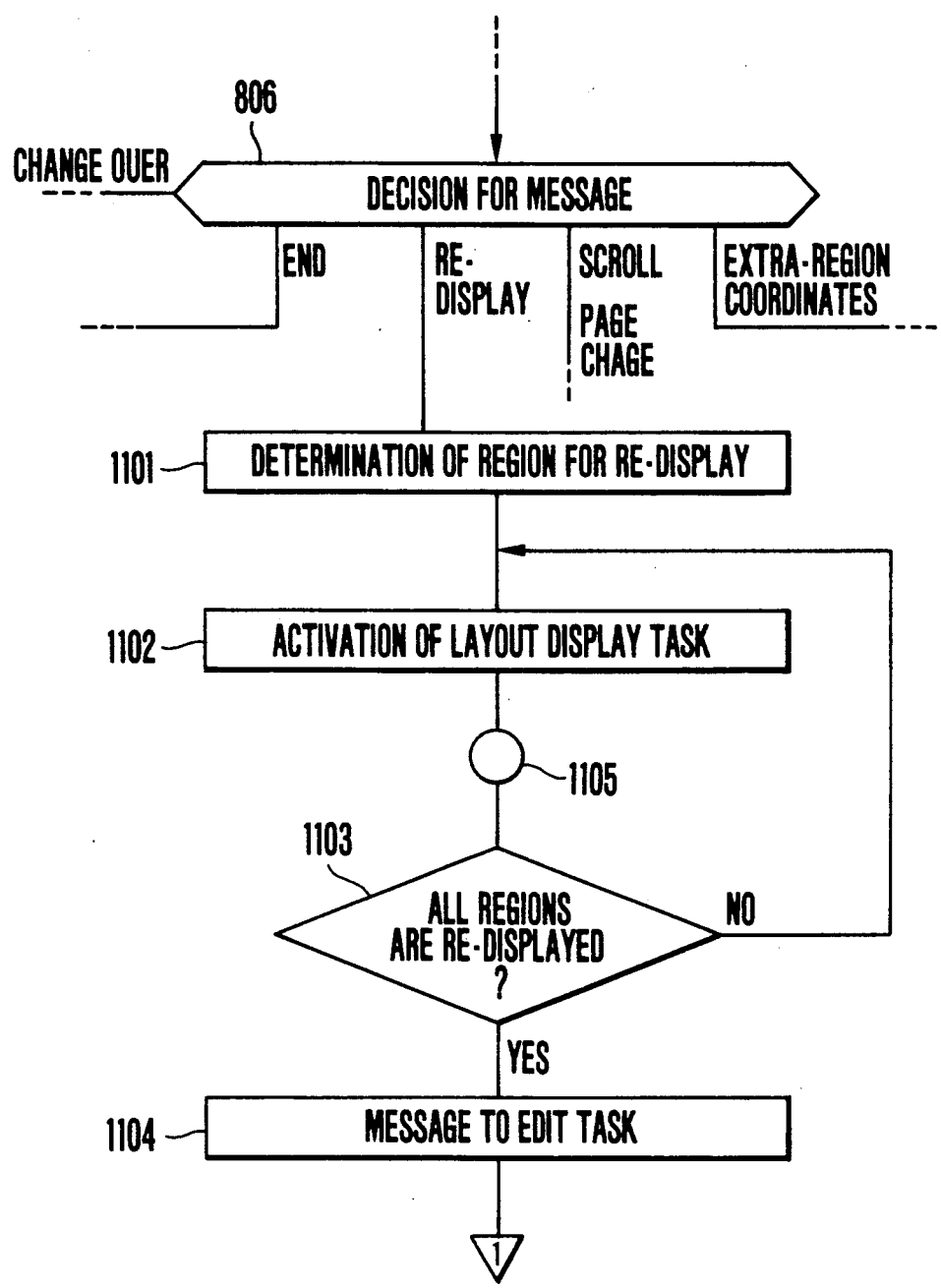
Figure 11B:
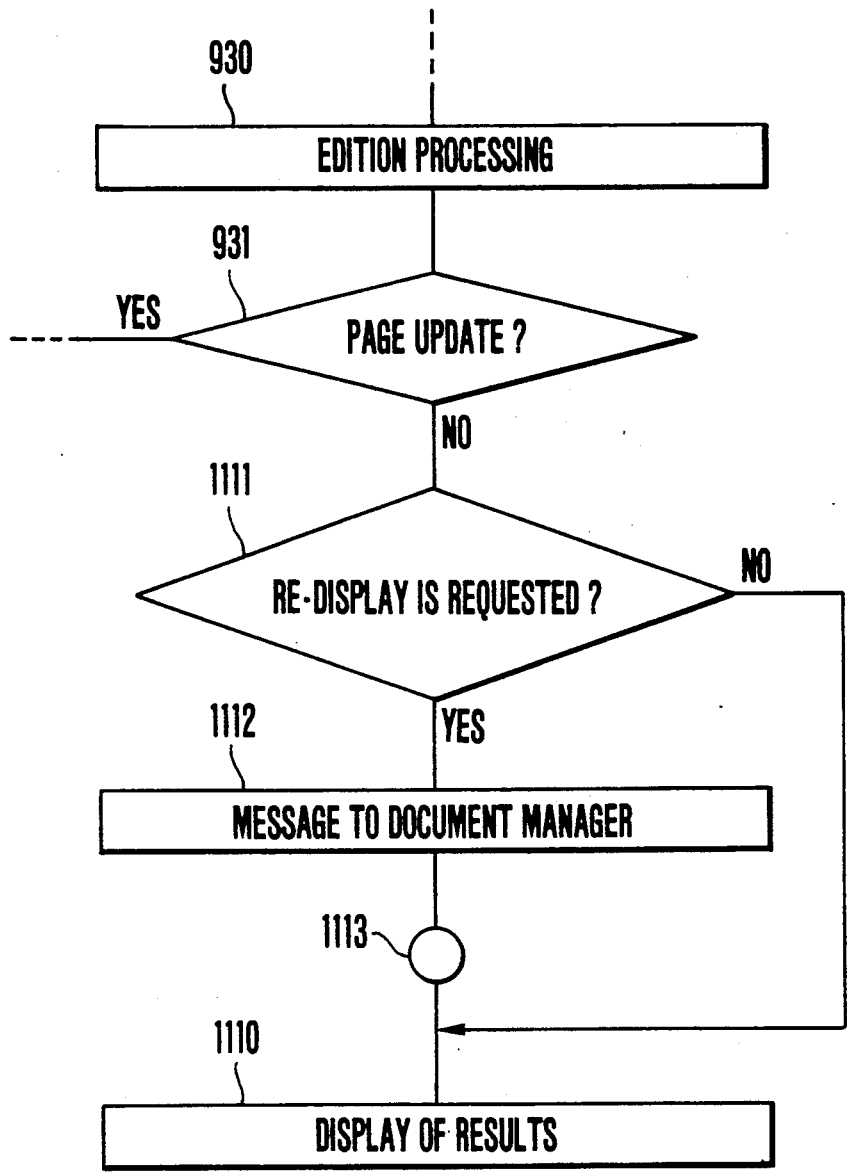

The problem mentioned above can be solved by two versions of the present invention, which will be described below. According to one of the versions of the invention, the processings performed by the document manager 300 and the edit task 310 are altered or modified, as shown in FIGS. 11A and 11B, respectively, wherein a message "RE-DISPLAY" is added in the Table 1 at 331a. When the document manager 300 receives the message "RE-DISPLAY", processings at steps 1101 to 1104 shown in FIG. 11A are performed. More specifically, a region having an overlap with a range to be re-displayed (described below) as given by the parameters carried by the message is determined by consulting the coordinate data table 560 (step 1101). At that time, the region being currently subject to the edition is excluded. The layout display task 320 for displaying the data of the region thus determined is then selected on the basis of the data species 422 contained in the region management table 420 corresponding to the determined region to be subsequently activated (step 1102). At the step 1105, the document manager 300 waits for a message from the layout display task 320 as activated. Upon reception of the message "LAYOUT DISPLAY COMPLETED" 331b from the layout display task 320, it is then checked whether there exists the region to be re-displayed at the step 1103. It is exists, the same processing procedure is repeated from the step 1102. If otherwise, the message 330 "LAYOUT ALTERATION COMPLETED" is sent to the edit task 310, whereupon the document manager 300 waits for a message from the edit task 310 at the step 840b shown in FIG. 8.

Referring to FIG. 11B, in the edit task 320, it is decided at a step 1111 whether re-display of the results of the edition processing 930 (step 110) is necessary or not (such re-display is required, for example, because of erasure of the graphics). If the result of the decision is affirmative, a message "RE-DISPLAY" is issued with the parameters for the range of the region required to be re-displayed (i.e. a rectangular area defined by the coordinates on the display screen 500 at the upper left corner and the lower right corner thereof (step 1112). Subsequently, the edit task 320 assumes the state waiting for a message from the document manager 300 at a step 1113. After the reception of the message or after the decision of the unnecessariness of the re-display at the step 1111, the result of the edition is re-displayed at a step 1110.

Figure 15:
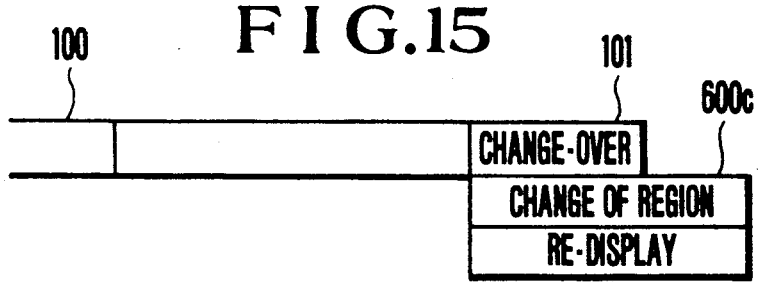
Figure 16:
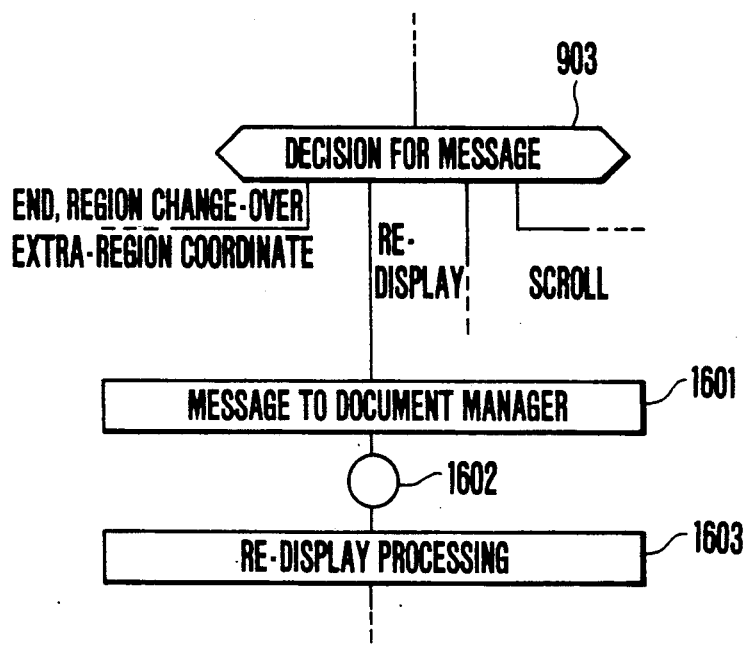

The other or second version of the present invention will be described by reference to FIG. 11A along with FIGS. 15 and 16. The processing performed by a document manager 300 is the same as that of the manager described above. Accordingly, the following description is directed to the processing performed by the edit task 310. When the change-over function 101 is designated, the pull-down menu 600c is displayed, as shown in FIG. 15, to allow the processing for either the change-over of the region or the re-display to be selected. When the result of the decision for the input at a step 903 shows that the re-display processing is selected, the edit task 310 issues the message "RE-DISPLAY" to the document manager 300 at a step 1601, whereupon the edit task 310 waits for the message "LAYOUT ALTERATION COMPLETED" from the document manager 300. As the parameter for that message, the coordinates of the region are utilized. Upon reception of the message from the document manager 300, the edit task 310 performs the re-display processing (step 1603).

According to the first mentioned version of the invention, the latest updated layout can always be displayed, whereby the edition can be carried out while observing the print image at any given time to great advantage, although some delay is involved in the edition processing to disadvantage. In the case of the second mentioned version of the invention, although the latest updated layout can be always displayed, the re-display function can be realized at a given time point as demanded by the operator without lowering the speed of the edition processing, thereby being advantageous over the embodiment described hereinbefore in conjunction with FIGS. 8 and 9.

FIGS. 12A and 12B are views showing contents of displays generated on the display screen 500 in the documentation system according to a further embodiment of the invention in which two edition modes, i.e. a layout edition mode and a word-processor mode are provided. More specifically, FIG. 12A shows the content on the display screen 500 in the course of edition in the layout edition mode (according to a first program). In the case of all the embodiments described in the foregoing, the same layout as the print image is displayed on the display screen 500, as shown in FIG. 12A. The layout edition mode according to the instant embodiment can be realized in the same manner as in the case of the embodiments described hereinbefore. FIG. 12B shows the content on the display screen 500 generated in the word-processor mode (according to a second program). The image display in the wordprocessor mode is controlled substantially in the same manner as the conventional word processors. Namely, the image as displayed is managed on a row and column basis, wherein vertical and horizontal character sizes as well as inclinations (italics) are represented by corresponding symbols. By way of example, a symbol denoted by 1201 in FIG. 12B designates a vertically and horizontally double size, and symbols 1202 and 1203 designate the vertically double size and the italic style, respectively. Further, a symbol 1204 indicates a new line (paragraph). In the word processor mode, neither line space nor intercharacter space are reflected in the display generated on the display screen 500.

Figure 17:
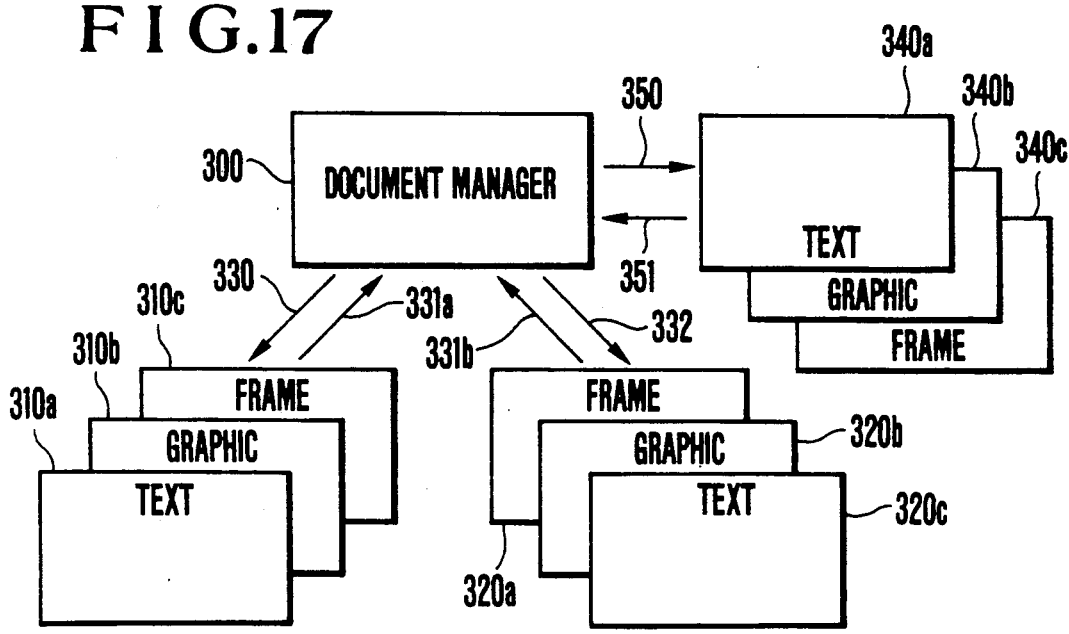

By referring to FIGS. 13 and 14 along with FIG. 17, description will be made of a method of realizing the word processor mode according to the instant embodiment. For realizing the word processor mode, a word processor edit program 340 capable of running in the word processor mode is added, as shown in FIG. 17. In this figure, an arrowhead line 350 represents that the document manager 300 activates the word processor edit program 340, and an arrowhead line 351 represents two types of messages which include a "CHANGE OVER" and a message "PROCESSING END".

Figure 13:
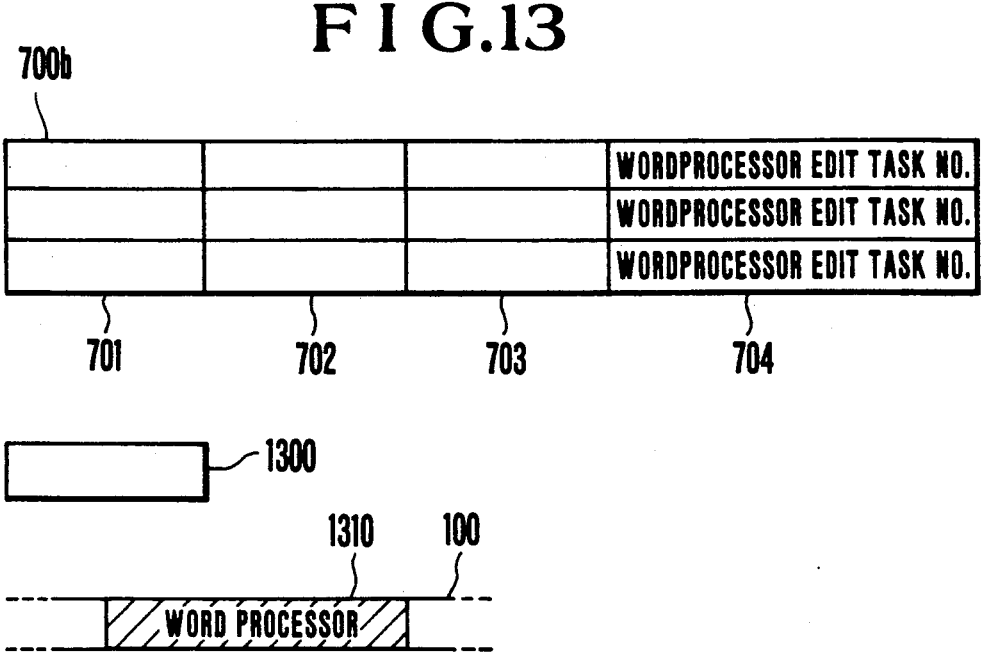

A program manage table 700b shown in FIG. 13 corresponds to the table 700a shown in FIG. 7 except that an edit task number 704 of the word processor edit program operating in the word processor mode is added. As a manage table of the document manager 300, a mode manage table 1300 is provided. Further, the menu bar 100 is additionally provided with a function menu 1310 for changing over the layout edition mode (first program) and the word processor program (second program) with each other. When this function menu 1310 is normally or positively displayed, this indicates the layout edition mode, while negative display thereof indicates the word processor mode.

The processing flow in the document manager 300 is generally the same as with the case of the embodiment described hereinbefore in conjunction with FIG. 8 or FIG. 11A and differs from the latter only a little in some of the individual processing steps. At first, through the initialization processing step 801, the layout edition mode is set at the mode manage table 1300. When it is decided at a step 802 that the menu function 1310 is designated or commanded, the display thereof is reversed (changed over to the negative display), while the layout edition mode in the table 1300 is replaced by the word processor mode. Finally, in the edit task activation processing 805, the mode set at the table 300 is checked. When it is the word processor mode, the edit task 340 (FIG. 17) corresponding to the word processor edit task 704 (FIG. 13) is activated. On the other hand, in the case of the layout edition mode, the edit task 320 indicated at 703 is activated. When the edit task 340 is activated, the parameter required for the activation is only the name of the file in which the document data are stored.

Figure 14:
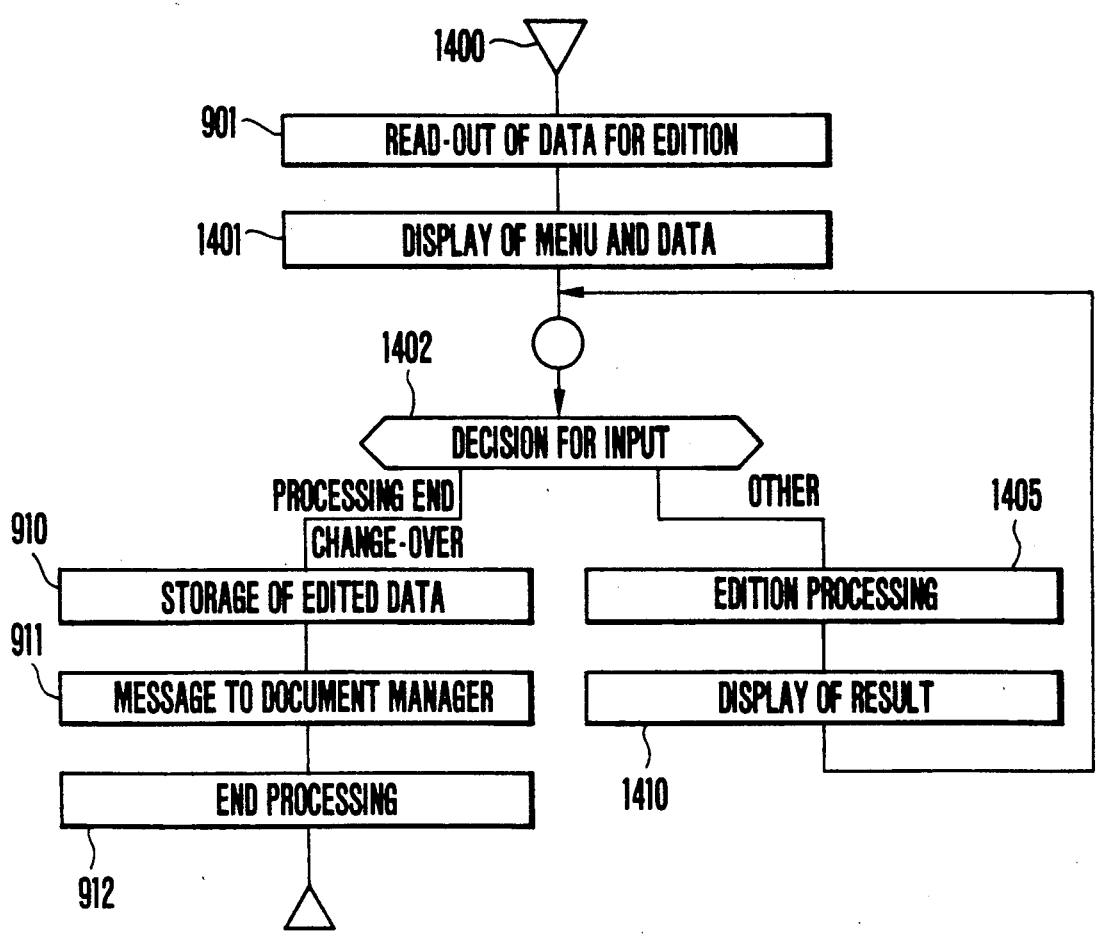

A flow of processings performed by the edit task 340 is illustrated in FIG. 14. Referring to the figure, at a step 1401, the work area is initialized with the menu being displayed, while the layout display is erased and replaced by the display of the image for edition. In the case of the text edition, by way of example, the display shown in FIG. 12A is changed over to the display shown in FIG. 12B. The content of the menu bar 100 is the same as that for the edit task 310. When it is decided at a step 1401 that the input is a command for the menu function 101 or 104, the processing through the step 910 to 912 described hereinbefore by reference to FIG. 9 is performed, whereupon the edition processing comes to an end. In case the input designates other command, the edition processing and the display processing for the result of the former are performed at steps 1405 and 1410. Although the edit function is substantially the same as that of the embodiment shown in FIG. 9, it is noted that a coordinate system susceptible to the coordinate transformation in a much simplified manner can be employed, because the coordinate system of the display screen 500 can be established by the edit task 340. In the case of the text edition, by way of example, a row/column-based coordinate system is employed in place of the dot-based coordinate system. When the dot-based coordinate system is employed, the inter-line space and the inter-character space have to be taken into consideration for identifying the character indicated by the cursor 110 on the basis of the coordinates designated thereby. On the other hand, in the row/column coordinate system, it is sufficient to identify the character located at the row and the column determined through the translation of the dot coordinate system into the row/column coordinate system, whereby the processing can be simplified and speeded up.

In the word processor mode according to the instant embodiment, the coordinate system translation requires no complicated calculation and ensures a high-speed processing. In particular, in the case of the text edition, neither the size doubling processing nor the character modifying processing is required, as the result of which the display of the result of edition can be generated extremely rapidly. Further, since the display in the word processor mode is lacking in the concept of page, there is no necessity of altering the display every time the page is updated, which means that the efficiency in the inputting of an extremely long text can be significantly enhanced.

A version of the embodiment incorporating the word processor mode will be described below. According to this version, storage of the task number in the program manage table 700b at 702 and 704 is replaced by the storage of a specific symbol which can be discriminated from the task number. In that case, when the specific symbol is stored at the column of the table 700b where the task number of the edit task 340 or 310 is to be stored, the document manager 300 activates the edit task of other mode.

Concerning the graphic edition, by way of example, any significant difference can not be seen between the layout edition mode and the word processor mode in respect to the contents and the processing speed, the graphic edit task 340b for the word processor mode may be spared and instead a specific symbol can be stored at the column relevant to the graphic data in the table 704. When a graphic region is designated in the course of the text edition in the word processor mode, display of the layout is generated by the document manager 300, making possible the edition by the graphic edit task 310b on the displayed layout image.

Preparation of the specific symbol can be left to discretion of the user. In general, the conventional word processor is equipped with means for allowing the user himself or herself to prepare specific data such as a user-only dictionary, stereotype words or expressions which are registered in the processor system to be utilized for the edition. Thus, by providing a means similar to the abovementioned one, it is possible to allow the user to prepare the specific symbols to be stored in the program manage table 700b at 702 and 704, whereupon the created specific symbols are registered in a system area of a hard disc or a floppy disc. The document manager 300 can read out the content of the relevant system area at the time of initialization processing to place it in the program manage table 700b at the columns 702 and 704.

By virtue of the teaching of the invention incarnated in the embodiment described above, the user can operate the documentation system by limiting selectively the functions thereof in accordance with the content of the work imposed on him or her to thereby enhance the efficiency in the preparation of document to advantage.

It will now be appreciated from the foregoing that even when the regions allocated with data for the edition overlap one another in a much complicated manner, any given region can be selected on the layout display screen with a minimum number of manipulation steps to thereby permit the edition to be performed on the displayed layout image according to the invention. Thus, edition of the document in which the texts and the graphics form a complicated layout can be much facilitated according to the invention, to great advantage.

Further, according to the present invention, images of other regions once destroyed in order to display the result of the edition in one region can be immediately regenerated, whereby the edit processing can always be performed on the complete print image to further great advantage.

Additionally, according to another aspect of the invention, since the text of a great length can be inputted at a high speed as in the case of the conventional word processor, the documentation system can be selectively made use of in dependence on the applications or words as imposed.

We claim:

1. A computer aided document editing system comprising:
    storage means for storing document data including various types of data which respectively correspond to different edition programs, said document data having a document structure including at least one document page and said at least one document page being partitioned into regions in accordance with at least one of said edition programs;
    display means for displaying said document data as images in accordance with a display program;
    management program executing means for executing a management program which manages addresses of said regions;
    designating means for designating coordinates to be edited of said at least one document page, said at least one document page being displayed by said display means;
    comparing means for comparing said designated coordinates with coordinates located within said partition regions of said at least one document page;
    first determining means for determining a region of said at least one document page which includes said designated coordinates;
    second determining means for determining a data type which can be accepted by said determined region by looking up a table indicating a relationship between the partitioned regions of said at least one document page and various data types;
    third determining means for determining an edition program which corresponds to said determined data type by looking up a table indicating a relationship between the various data types and the edition programs;
    starting means for starting up said determined edition program;
    waiting means for waiting for a message from said determined edition program; and
    repeating means for repeating the functions of said designating means, said comparing means, said first, second and third means, said starting means and said waiting means when said message from said determined edition program consists of coordinate data;
    edition program executing means for executing said determined edition program;
    display means for displaying a command corresponding to data to be edited by said determined edition program; and
    checking means for checking inputted coordinates for producing a first message to provide information pertaining to said designated coordinates to be edited and for completing the method performed by said determined edition program when the inputted coordinates are outside a region including said designated coordinates to be edited;
    display program executing means for executing said display program; and
    message transfer means for transferring messages between said edition program executing means and said management program executing means, wherein said first message is transferred to said management program executing means and said management program executing means responds to reception of said first message by activating an edition program relevant to a region including the coordinates outside the region which includes the designated coordinates to be edited.

2. A computer aided document editing system according to claim 1, said edition program executing means including means for issuing a command for re-displaying a document image, wherein a message commanding display of the document image undergone in edition processing is issued to said display program in response to the re-display command of said issuing means.

3. A computer aided document editing system according to claim 1, said edition program executing means including means for commanding a change-over of said regions, wherein said determined edition program responds to the region change-over command issued by said commanding means for issuing to said management program executing means a message indicating the change-over of at least one of said regions, said management program executing means selecting a region to which edition processing is to be changed over from regions being displayed by said display means and activating an edition processing.

4. A computer aided document editing system according to claim 1, further including means for performing an edition processing permitting high-speed data entry, and alternating means for selectively alternating between a program for said edition processing permitting high-speed data entry and a program for edition processing of document data in at least one of said regions.

5. A computer aided document editing system according to claim 4, wherein said means for performing an edition processing permitting high-speed data entry is constituted by a conventional word processor apparatus.

6. A computer aided document editing system according to claim 4, wherein said alternating means includes means for indicating whether given document data can be processed for edition by one of edition processing executing means capable of said high-speed data entry and the program for processing document data in said at least one of said regions, wherein when document data commanded for edition processing can not be processed by one edition processing, another edition processing capable of processing document data is selected.

7. A computer aided document editing system according to claim 1, further comprising:
fourth determining means for determining whether said message from said determined edition program is a second message for commanding a re-display of document data;
detecting means for detecting all of the regions which overlap a region currently being edited when said message from said determined addition program is said second message; and
fifth determining means for determining data types which can be accepted by said overlapping regions and starting up display programs corresponding to said determined data types.

8. A computer aided document editing system according to claim 7, further comprising:
sixth determining means for determining whether said message from said determined edition program is a third message which commands a change of a region to be edited; and
re-designating means for, when said message from said determined edition program is said third message, re-designating the inputted coordinates in order to repeat the functions of said designating means, said comparing means, said first, second and third means, said starting means and said waiting means, said determined edition program being provided with a command to change a region and informing said management program of a region change when said command to change a region has been instructed.

9. A computer aided document editing system according to claim 1, wherein said determined region includes a plurality of objects, said objects being one of text objects, graphic objects and framed objects.

10. A method for editing documents in computer aided editing system, wherein a document page to be edited is displayed on a screen and document data including at least text data and graphic data are stored in a memory, said document includes at least one document page and said at one document page is partitioned into regions in accordance with an edition program to be applied, and said system comprises a management program, editing programs for executing data editing, and display programs for displaying data on the screen, said method comprising the steps performed by said management program as aided by said computer aided editing system of:
(a) designating coordinates to be edited of said at least one document page, said at least one document page being displayed by said screen;
(b) comparing said designated coordinates with coordinates located within said partitioned regions of said at least one document page;
(c) determining a region of said at least one document page which includes said designated coordinates;
(d) determining a data type which can be accepted by said determined region by looking up a table indicating a relationship between the partitioned regions of said at least one document page and various data types;
(e) determining an edition program which corresponds to said determined data type by looking up a table indicating a relationship between the various data types and the edition programs;
(f) starting up said determined edition program;
(g) waiting for a message from said determined edition program; and
(h) repeating steps (a)-(g) when said message from said determined edition program consists of coordinate data;
said method further comprising the steps performed by said determined edition program of:
(i) displaying a command corresponding to data to be edited by said determined edition program; and
(j) checking the inputted coordinates for producing a first message to provide information pertaining to said designated coordinates to be edited and for completing the method steps performed by said determined edition program when the inputted coordinates are outside a region including said designated coordinates to be edited.

11. A method for editing documents in a computer aided editing system according to claim 10, wherein after step (g) said management program performs the steps of:
(k) determining whether said message from said determined edition program is a second message for commanding a re-display of document data;
(l) detecting all of the regions which overlap a region currently being edited when said message from said determined addition program is said second message; and
(m) determining data types which can be accepted by said overlapping regions and starting up display programs corresponding to said determined data types.

12. A method of editing documents in a computer aided editing system according to claim 11, wherein after step (g) said management program performs the steps of:
(o) determining whether said message from said determined edition program is a third message which commands a change of a region to be edited; and
(p) when said message from said determined edition program is said third message, re-designating the inputted coordinates in order to repeat steps (a)-(g), said determined edition program being provided with a command to change a region and informing said management program of a region change when said command to change a region has been instructed.

13. A method of editing documents in a computer aided editing system according to claim 10, wherein said determined region includes a plurality of objects, said objects being one of text object, graphic objects and framed objects.

* * * * *